United States Patent
Brice et al.

(10) Patent No.: US 8,640,138 B2
(45) Date of Patent: *Jan. 28, 2014

(54) AUTHENTICATING A PROCESSING SYSTEM ACCESSING A RESOURCE VIA A RESOURCE ALIAS ADDRESS

(75) Inventors: Frank William Brice, Hurley, NY (US); David Darden Chambliss, Morgan Hill, CA (US); Matthew Joseph Kalos, Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,316

(22) Filed: Apr. 30, 2012

(65) Prior Publication Data

US 2012/0216211 A1    Aug. 23, 2012

Related U.S. Application Data

(63) Continuation of application No. 12/030,147, filed on Feb. 12, 2008, now Pat. No. 8,230,435.

(51) Int. Cl.
*G06F 9/46* (2006.01)
*H04L 29/06* (2006.01)

(52) U.S. Cl.
USPC .......................................... 718/104; 713/150

(58) Field of Classification Search
USPC ............................................. 718/1, 104, 105
See application file for complete search history.

(56) References Cited

U.S. PATENT DOCUMENTS

| | | |
|---|---|---|
| 5,448,718 A | 9/1995 | Cohn et al. |
| 6,253,294 B1 | 6/2001 | Dahman et al. |
| 6,304,980 B1 | 10/2001 | Beardsley et al. |
| 6,538,669 B1 | 3/2003 | Lagueux, Jr. et al. |
| 6,675,281 B1 | 1/2004 | Oh et al. |
| 7,461,170 B1 * | 12/2008 | Taylor et al. .................. 709/245 |
| 7,743,404 B1 * | 6/2010 | Deutschmann et al. .......... 726/2 |
| 2002/0078213 A1 | 6/2002 | Chang et al. |
| 2002/0128906 A1 * | 9/2002 | Belth .............................. 705/14 |
| 2003/0131214 A1 | 7/2003 | Downer et al. |

(Continued)

OTHER PUBLICATIONS

P. Rogers, et al., "ABCs of z/OS System Programming vol. 10", IBM Corporation, Document No. SG24-6990-01, Sep. 2006.

(Continued)

*Primary Examiner* — Thomas Lee
*Assistant Examiner* — Phil Nguyen
(74) *Attorney, Agent, or Firm* — David W. Victor; Konrad Raynes Davda & Victor LLP

(57) ABSTRACT

Provided are a method, system, and article of manufacture for authenticating a processing system accessing a resource. An association of processing system identifiers with resources, including a first and second resources, is maintained. A request from a requesting processing system in a host is received for use of a first resource that provides access to a second resource, wherein the request is generated by processing system software and wherein the request further includes a submitted processing system identifier included in the request by host hardware in the host. A determination is made as to whether the submitted processing system identifier is one of the processing system identifiers associated with the first and second resources. The requesting processing system is provided access to the first resource that the processing system uses to access the second resource.

15 Claims, 4 Drawing Sheets

(56) References Cited

U.S. PATENT DOCUMENTS

| | | | |
|---|---|---|---|
| 2003/0149897 A1 | 8/2003 | Ylitalo et al. | |
| 2003/0158949 A1 | 8/2003 | Miller et al. | |
| 2004/0010682 A1 | 1/2004 | Foster et al. | |
| 2004/0054916 A1 | 3/2004 | Foster et al. | |
| 2004/0088576 A1 | 5/2004 | Foster et al. | |
| 2004/0168082 A1 | 8/2004 | Foster et al. | |
| 2004/0193887 A1 | 9/2004 | Foster et al. | |
| 2005/0015594 A1 | 1/2005 | Ashley et al. | |
| 2005/0063333 A1* | 3/2005 | Patron et al. | 370/329 |
| 2005/0235319 A1* | 10/2005 | Carpenter et al. | 725/52 |
| 2006/0085620 A1* | 4/2006 | Walker | 711/200 |
| 2006/0106998 A1* | 5/2006 | Kalos et al. | 711/152 |
| 2006/0114917 A1 | 6/2006 | Raisch | |
| 2006/0150173 A1* | 7/2006 | McHugh et al. | 717/162 |
| 2006/0190456 A1* | 8/2006 | Moses | 707/9 |
| 2007/0136552 A1 | 6/2007 | Yudenfriend et al. | |
| 2009/0204972 A1 | 8/2009 | Brice, Jr. et al. | |

OTHER PUBLICATIONS

1st Office Action dated Jun. 30, 2011, for U.S. Appl. No. 12/030,147, filed Feb. 12, 2008, by inventors F.W. Brice, Jr., et al., pp. 1-19.

Response dated Sep. 30, 2011, pp. 1-15, to 1st Office Action dated Jun. 30, 2011, for U.S. Appl. No. 12/030,147, filed Feb. 12, 2008, by inventors F.W. Brice, Jr., et al., pp. 1-19.

2nd Office Action dated Nov. 15, 2011, for U.S. Appl. No. 12/030,147, filed Feb. 12, 2008, by inventors F.W. Brice, Jr., et al., pp. 1-12.

Response dated Feb. 15, 2012, pp. 1-15, to 2nd Office Action dated Nov. 15, 2011, for U.S. Appl. No. 12/030,147, filed Feb. 12, 2008, by inventors F.W. Brice, Jr., et al., pp. 1-12.

Notice of Allowance dated Mar. 20, 2012, pp. 1-5 for U.S. Appl. No. 12/030,147, filed Feb. 12, 2008, by inventors F.W. Brice, Jr., et al.

* cited by examiner

Control Unit Alias Storage Pool Information

Path Group Control Block

AUTHENTICATING A PROCESSING SYSTEM ACCESSING A RESOURCE VIA A RESOURCE ALIAS ADDRESS

CROSS-REFERENCE TO RELATED APPLICATION

This application is a continuation of U.S. patent application Ser. No. 12/030,147, filed Feb. 12, 2008, which application is incorporated herein by reference in its entirety.

BACKGROUND

1. Field

The present invention relates to a method, system, and program for authenticating a processing system accessing a resource.

2. Description of the Related Art

In certain computing environments, multiple host systems may communicate with multiple control units (CUs) (also known as storage controllers, storage subsystems, enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS may be configured to include multiple volumes.

The host system may include a channel subsystem that maintains information to access volumes in an LSS in the control unit. The channel subsystem includes subchannels, which provides state tracking for the execution of the I/O operations for the channel subsystem and provides information on paths connecting the host to a volume in an LSS. The host operating system maintains a unit control block (UCB) providing information on a base unit address assigned to one volume and the subchannel that the channel subsystem uses to access the volume on the base device. The channel subsystem is aware of individual subchannels and the paths they have. In one implementation, the control unit may dynamically assign aliases from a pool of aliases when needed for host I/O operations and when the I/O operation completes, the alias address is returned to the pool for use with a subsequent I/O request. In this way, an alias is assigned for a single I/O request. In a static implementation, the customer may initially assign aliases to bases via external tools to the control unit and the aliases are used for I/O requests directed to the bases to which they are assigned.

Further, the control unit may assign alias addresses to the base addresses for volumes, where the alias addresses are used to allow concurrent I/O requests to be directed to the same volume. The control unit maintains information associating a base volume with the alias addresses assigned to that volume. The host processes the information in the UCB to address an I/O operation to a volume. In particular, the host initiates an I/O operation toward a volume by initiating a channel program which consists of a series of I/O instructions, such as a chain of channel command word (CCW) commands, at the subchannel.

The control unit maintains a different view of the system. The control unit is provided a base unit address for each device (volume) and zero or more alias unit addresses for each base unit address. After assigning a base address to each volume (device), the remaining addresses can be allocated as alias addresses to the base addresses. The control unit uses the unit addresses to physically access the volumes.

An I/O operation or chain of CCW commands can be simultaneously executed toward the same logical volume using the different base and alias unit addresses for the logical volume. In this way, the executed CCW commands are all directed toward the same logical volume using different addresses, wherein each address uses one of multiple channel paths to reach a single logical volume. This allows a single host to concurrently execute multiple I/O operations against a single volume. The number of aliases provided for a base may be set according to the size of the volume and the number of concurrent users. In certain cases, only a few aliases may be needed to accommodate network, e.g., Storage Area Network (SAN), traffic for a particular base address for a volume.

The host first attempts to access a volume (I/O device) through the base UCB for the volume. If the base UCB is unavailable, i.e., concurrently servicing another I/O operation, then the host may use one of the available alias UCBs assigned to that base UCB to concurrently access the volume. The host system then performs the I/O operations through the subchannel associated with the UCB and the channel paths provided for that subchannel.

SUMMARY

Provided are a method, system, and article of manufacture for authenticating a processing system accessing a resource. An association of processing system identifiers with resources, including a first and second resources, is maintained. A request from a requesting processing system in a host is received for use of a first resource that provides access to a second resource, wherein the request is generated by processing system software and wherein the request further includes a submitted processing system identifier included in the request by host hardware in the host. A determination is made as to whether the submitted processing system identifier is one of the processing system identifiers associated with the first and second resources. The requesting processing system is provided access to the first resource that the processing system uses to access the second resource.

DETAILED DESCRIPTION

Figure 1:
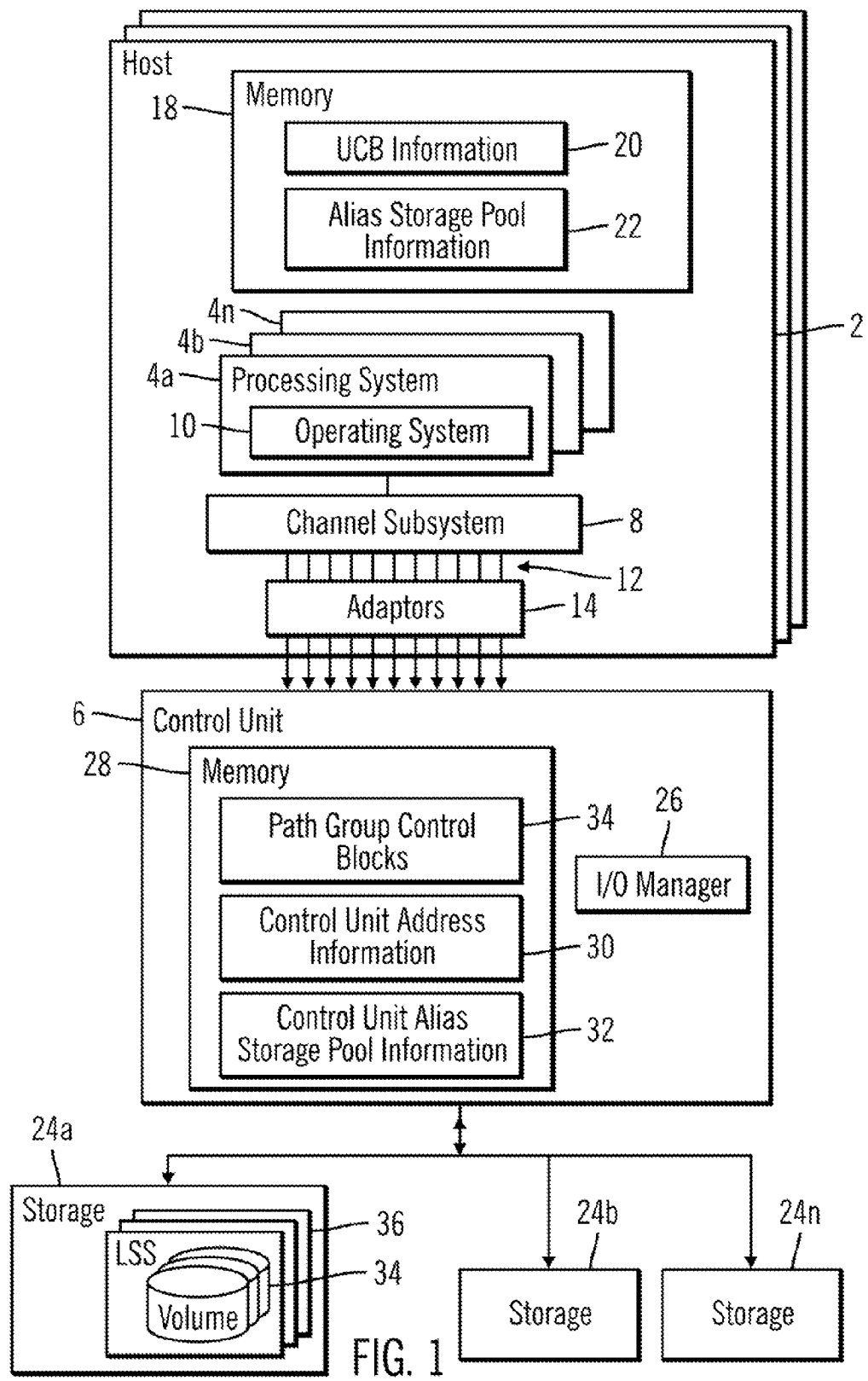
FIG. 1 illustrates an embodiment of a computing environment.

FIG. 1 illustrates a computing environment in which aspects of the invention are implemented. One or more hosts 2 (only one is shown) include one or more processing systems 4a, 4b . . . 4n that communicate Input/Output (I/O) requests to a control unit 6 through a channel subsystem 8 that provides a plurality of logical paths to the control unit 6. Each processing system 4a, 4b . . . 4n includes an operating system 10 to manage path related operations. The channel subsystem 8 manages logical paths 12 extending through adaptors 14. An adaptor provides the physical layer through which logical paths 12 extend to the control unit 6 or multiple control units through a switch (not shown). The operating system 10 may further associate multiple logical paths 12 with a path group, where all the paths in a path group may be used by one processing system 4a, 4b . . . 4n to communicate with the control unit 6. A path group used by one processing system 4a, 4b . . . 4n may be identified by a path group identifier (PGID). The operating system 10 may issue an I/O command (such as a Set Path Group ID CCW) to each path for the device using a world wide unique identifier (PGID). The control unit 6 creates a path group from the set of paths for a device that have the same PGID identifier.

In one embodiment, the channel subsystem 8 may be implemented as firmware or microcode. The channel subsystem 8 may be implemented in dedicated hardware comprising a separate set of integrated circuit chips.

Each processing system 4a, 4b . . . 4n may comprise a virtual machine, such as a logical partition (LPAR), to which computer resources, such as one or more central processing units (CPU) and memory resources are assigned. Each processing system 4a, 4b . . . 4n may execute their own operating system 10, device drivers, and may execute channel subsystem 8 code. In further embodiments, each processing system may comprise a logical partition of a processor. In this way, one or more processors in the host 2 may implement multiple logical partitions (LPARs). Multiple processing systems 4a, 4b . . . 4n may share a single logical channel subsystem 16 or different processing systems 4a, 4b . . . 4n may use different logical channel subsystems.

The channel subsystem 8 performs the operations to communicate I/O requests from the processing systems 4a, 4b . . . 4n to the control unit 6. The operating system 10 uses UCBs and manages I/O requests. The channel subsystem 8 obtains the I/O request from the channel subsystem 8. A memory 18, comprised of one or more memory devices, includes information used by the channel subsystem 8 to manage I/O requests. Each processing system 4a, 4b . . . 4n maintains its own UCB and alias storage pool information providing information on the UCB chains for each processing system 4a, 4b . . . 4n. Different processing systems 4a, 4b . . . 4n may have different UCB chains having different alias addresses assigned to the base addresses for a particular processing system.

The host memory 18 further includes alias storage pool information 22 providing information on the assignment of available alias addresses for different logical subsystems (LSS) 36 for the processing systems 4a, 4b . . . 4n, such that different processing systems 4a, 4b . . . 4n may use the same alias address for different base addresses. Further, different processing systems 4a, 4b . . . 4n may use the same alias address to for different base addresses, to assign the aliases in different configurations to the volumes and alias storage pool. In one embodiment, the memory 18 may maintain the UCB information 20 and alias storage pool information 22 for all processing systems 4a, 4b . . . 4n and LSSs 36, which is shared for all processing system operations at the same time. In a further embodiment, each processing system may maintain in its own memory the UCB information 20 and alias storage pool information 22 for that processing system 4a, 4b . . . 4n.

In one embodiment, there is a separate host memory 18 local to each processing system 4a, 4b . . . 4n operating system image. In one embodiment, the relationship of aliases to bases is maintained in the control unit address information 30 and with the operating system image for each processing system 4a, 4b . . . 4n. There may be an instance of the control unit address information 30 for each processing system 4a, 4b . . . 4n and LSS 36, where each instance of the control unit alias address information 32 may comprise the information shown in FIG. 5. In an alternative embodiment, the control unit address information 30 may be maintained local in the operating system image for each processing system 4a, 4b . . . 4n and only persistent in the control unit 6 address information 30 for the duration of the I/O.

The control unit 6 manages requests from the processing systems 4a, 4b . . . 4n to access storage systems 24a, 24b . . . 24n, such as tracks, partitions, logical devices, logical volumes, logical unit numbers (LUNs), logical subsystems (LSS) or other logical or physical units of storage. Storage 24a shows a configuration including one or more LSSs 32, where one or more volumes 34 are configured in each LSS 36. The volumes may extend across multiple storage devices. The term "device" refers to any physical or logical data storage unit, such as a physical track, LSS, partition, logical volume, volume, etc. The control unit 6 includes an I/O manager program 26 to process I/O requests to the storages 24a, 24b . . . 24n and logical and physical components configured therein, e.g., volumes, LSSs, etc. The control unit 6 has a control unit memory 28, comprised of one or more memory devices, in which the I/O manager 26 maintains control unit address information 30 having the assignment of base and alias addresses for defined storage units, such as volumes within a logical subsystem (LSS). The memory 28 further includes control unit alias storage pool information 32 having information on the alias addresses available for the processing systems 4a, 4b . . . 4n. The memory 28 also includes path group control blocks (PGCB) 34 providing information on a path group of logical paths used by a processing system 4a, 4b . . . 4n. A PGCB is created by the I/O manager 26 when the processing system 4a, 4b . . . 4n establishes a path group with the control unit 6, where the established path group comprises logical paths the processing system 4a, 4b . . . 4n uses to communicate with the control unit 6 and submit I/O requests and receive responses to the submitted I/O requests. The processing system 4a, 4b . . . 4n and control unit 6 may select any logical path in the path group established for the processing system 4a, 4b . . . 4n to communicate requests, information and alerts.

The hosts 2 may comprise computational devices known in the art, such as a workstation, mainframe, server, etc. The control unit 6 may comprise a storage subsystem or server, such as an enterprise storage server, storage controller, etc., or other device used to manage I/O requests to attached volumes. The storages 24a, 24b . . . 24n may comprise storage devices known in the art, such as interconnected hard disk drives (e.g., configured as a DASD, RAID, JBOD, virtualized devices, etc.), magnetic tape, electronic memory, flash memory, optical disk, etc. The host 2 may communicate with the control unit 6 over the logical paths 12, which may extend through a network, such as a Local Area Network (LAN), Storage Area Network (SAN), Wide Area Network (WAN), peer-to-peer network, wireless network, etc. Alternatively, the host 2 may communicate with the storage controller 6 over a bus interface, such as a Peripheral Component Interconnect (PCI) bus or serial interface.

Figure 2:
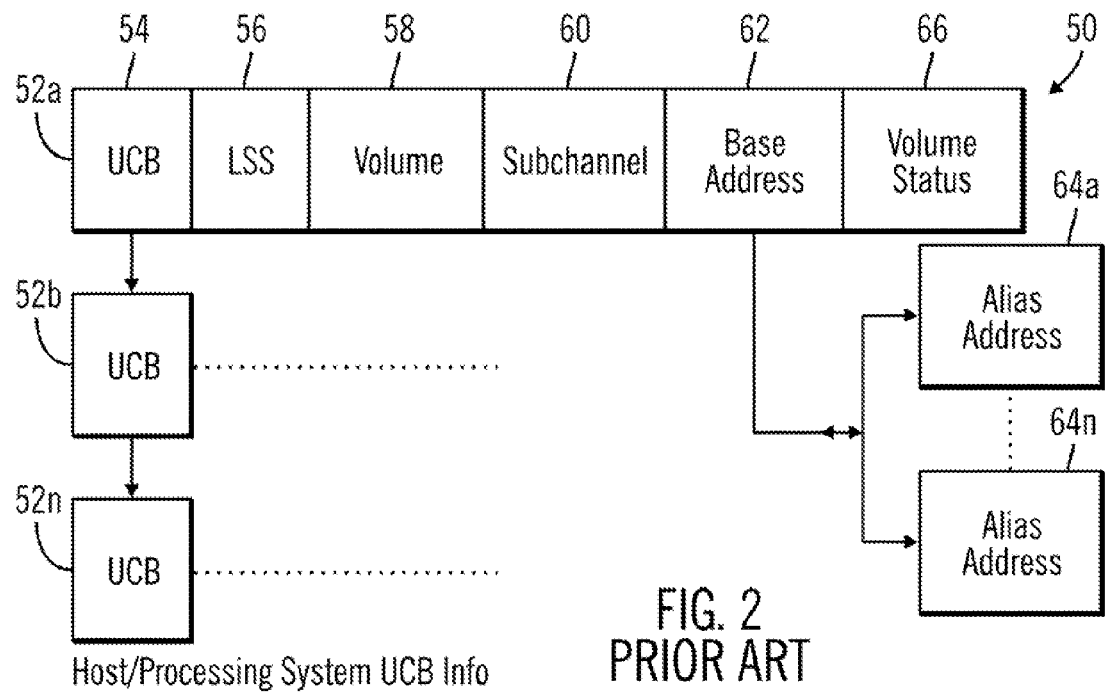
FIGS. 2 and 4 illustrate embodiments of information a host maintains to access volumes known in the prior art.

FIG. 2 illustrates host/processing system UCB information 50 known in the prior art having information on the assignment of base and alias addresses to the volumes for one processing system 4a, 4b . . . 4n and LSS 36. An instance of the information 50 would be maintained for each separate processing system 4a, 4b . . . 4n and LSS 36 pair in the host 2. The instances of the UCB information 50 comprise the UCB information 20. The information 50 includes UCB entries 52a, 52b . . . 52n for one processing system 4a, 4b . . . 4n, which includes for each UCB in the chain the following information: a UCB identifier 54 of a UCB providing information to access one volume configured in the storages 24a, 24b . . . 24; a logical subsystem (LSS) 56 identifying an LSS 36 in which the volume 34 is configured; a volume 58 in the LSS 36 identified in field 56 for which the information is provided; a subchannel 60 of the channel subsystem 8 comprising a subchannel number, index or pointer providing information on the volume; a base address 62 for the subchannel; and one or more alias addresses 64a . . . 64n used to additionally address the volume (if any have been assigned); and volume status 66 providing information on the status of the volume. In certain embodiments, alias addresses are only associated with a specific base address 62 when an I/O operation is active for that base (volume). Otherwise the aliases reside in a pool of available aliases not associated with any specific base (volume).

In one embodiment, alias addresses may be initially associated with bases in the storage subsystem (LSS) of the control unit 6. If the storage subsystem supports the alias address pooling, then the operating system 10 issues a "set subsystem characteristics command" to tell the control unit 6 to operate in a mode where alias addresses are pooled and assigned only when needed. This command causes the alias addresses to no longer be associated with a specific base address 62 for that processing system 4a, 4b . . . 4n. Each operating system in a processing system 4a, 4b . . . 4n can change their alias addressing modes independently. At this point, the alias addresses are available to be assigned to a base address 62 as I/O operations are started, and returned to the pool as operations complete. Likewise, the devices in the LSS can be switched by the customer back to the original mode of operation where aliases are statically assigned to base addresses. In this way, the operating system may transition in and out of the mode where alias addresses are dynamically assigned and used to a mode where they are statically assigned and used.

In the illustrated embodiment of FIG. 2, the UCB information 50 provides a chain of UCBs 52a, 52b . . . 52n for one processing system 4a, 4b . . . 4n and one LSS 36 configured in the storages 24a, 24b . . . 24n, where each UCB 52a, 52b . . . 52n includes information for one volume. In alternative embodiments, the UCB information 50 may include different information for different storage systems and environments to provide information on base and alias addresses assigned to volumes configured in the storages 24a, 24b . . . 24n. Further, if the system is not implementing channel subsystem technology, then information on the subchannel, such as field 60 may not be included.

Figure 3:
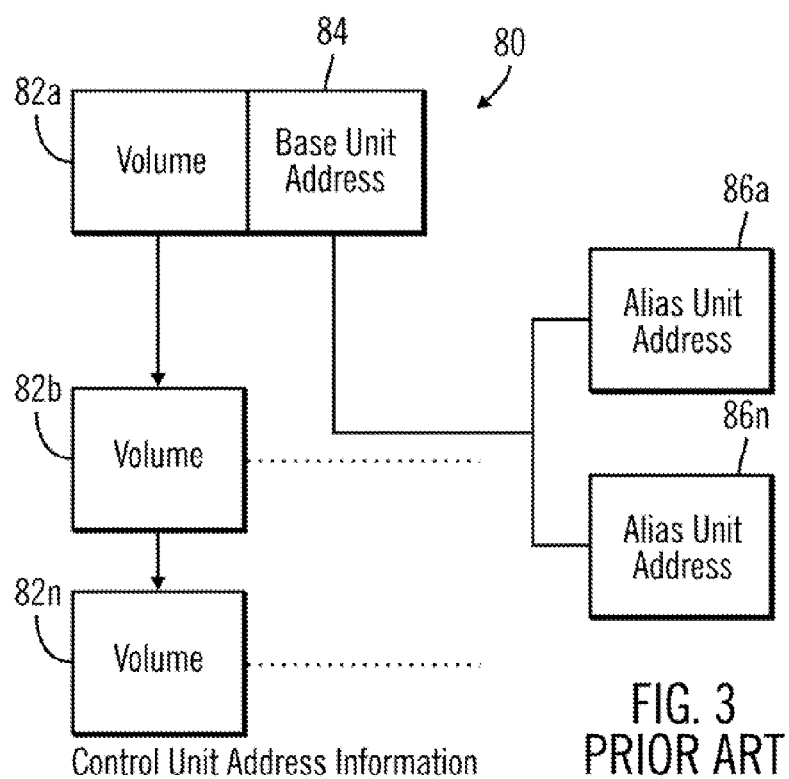
FIGS. 3 and 5 illustrate embodiments of information a control unit maintains to allow a host to access volumes managed by the control unit. The information of FIG. 3 is known in the prior art.

FIG. 3 illustrates an embodiment of control unit address information 80 having information known in the prior art on the assignment of base and alias addresses for one processing system 4a, 4b . . . 4n and logical subsystem 32 configured in the storages 24a, 24b . . . 24n. An instance of the information 50 would be maintained for each separate processing system 4a, 4b . . . 4n and each logical subsystem (LSS) that the processing system 4a, 4b . . . 4n may access. The address information 80 includes an entry 82a . . . 82n for each volume 34 configured in the logical subsystem (LSS) 32 for which the information 80 is maintained. The instances of the control unit address information 80 comprise the control unit address information 30. Each entry 82a, 82b . . . 82n (FIG. 3) includes: a volume identifier 84; the base address 86 assigned to the volume; and zero or more alias addresses 86a . . . 86n that may be assigned to the base address 84 to additionally use to access the volume. In a dynamic alias assignment environment, the control unit alias storage pool information 100 (FIG. 5) is maintained for the duration of an I/O request, and after completing the I/O request the alias addresses are returned to an alias storage pool.

Figure 4:
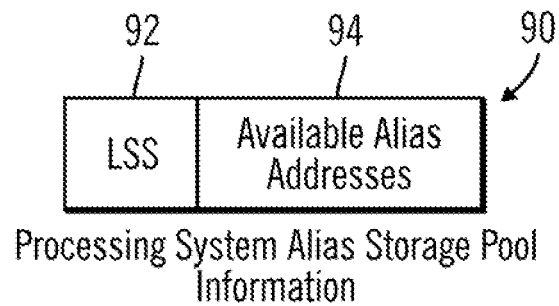

FIG. 4 illustrates an embodiment of processing system storage pool information 90 maintained for one processing system 4a, 4b . . . 4n and one logical subsystem (LSS) 32. The instance of the processing system storage pool information 90 includes, for one processing system 4a, 4b . . . 4n, the logical subsystem (LSS) 92 to which the information applies and the available alias addresses 94 that may be assigned to volumes configured within the LSS 92. The instances 90 of the processing system storage pool information for each LSS 36 the processing systems 4a, 4b . . . 4n may access comprises the alias storage pool information 22.

Figure 5:
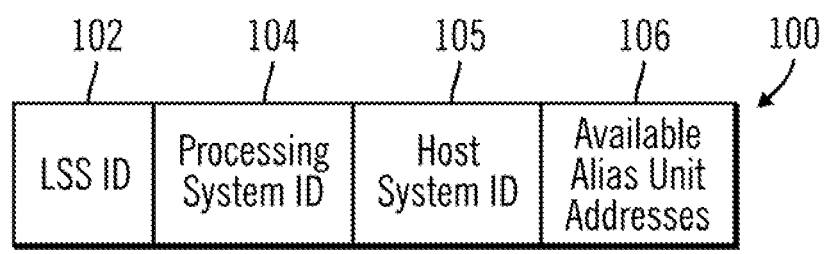

FIG. 5 illustrates an embodiment of control unit alias storage pool information 100 maintained for one logical subsystem (LSS) 32 and one processing system 4a, 4b . . . 4n. The instance of the control unit system storage pool information 100 includes, for one processing system 4a, 4b . . . 4n and logical subsystem 32, the logical subsystem (LSS) identifier 102, the processing system ID 104 to which the information applies, the host system ID 105 in which the processing system 104 is included, and the available alias addresses 106 that may be assigned to volumes 34 configured within the LSS 102 for the processing system 104 in the host 105. The processing system 104 information may comprise a host logical address and may be transmitted with the I/O request. Each processing system 4a, 4b . . . 4n may have a unique host logical address within the host 2, but may not be unique between hosts 2. The channel subsystem 8 may provide each processing system 4a, 4b . . . 4n its ID or host logical address. The host system ID 105 may comprise a world wide node name (WWNN) of the host 2. The host system ID 105 is unique among hosts. A node descriptor identifies the channel or adaptor 14, where each adaptor 14 provides one path. Each host 2 can have multiple node descriptors, one for each adaptor 14 in the host, and each node descriptor provides a unique identifier for one adaptor 14, such as a host bus adaptor (HBA). Further, each node descriptor may include the machine serial number of the host 2 in which the adaptor 14 is included. Thus, all node descriptors for adaptors 14 in one host 2 have a common host machine serial number of the host in which they are included, which may comprise the host ID, e.g., the WWNN of the host.

In alternative embodiments, the storage pool information 90 may include different information for different storage systems and environments to provide information on base and alias addresses assigned to volumes configured in the storages 18a, 18b . . . 18n. The control unit alias storage pool information 30 comprises one instance 100 of the processing system storage pool information for each LSS and processing system 4a, 4b . . . 4n.

Figure 6:
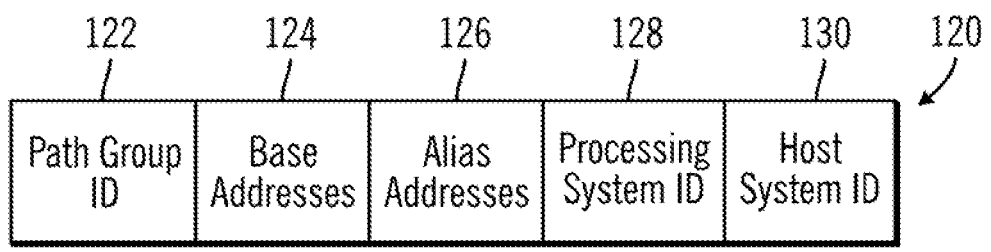
FIG. 6 illustrates an embodiment of information associated with a path group.

FIG. 6 illustrates an embodiment of a path group control block 120 including information associated with a path group established for one processing system 4a, 4b . . . 4n comprising logical paths used for communication between the processing system 4a, 4b . . . 4n and control unit 2. A path group control block 120 includes a path group identifier (PGID) 122 identifying the path group, base addresses 124 of volumes 34 assigned to the path group, alias addresses 126 assigned to the path group that may be used to access the volumes or shared resources identified by the base addresses 124, a processing system identifier (ID) 128 for the processing system 4a, 4b . . . 4n (such as a node descriptor) for which the path group was established, and a host system identifier 130 of the host system 2 including the processing system 4a, 4b . . . 4n assigned to the path group identified by the PGID 122. In one embodiment, the processing system ID 128 and host system ID 130 are included by host 2 hardware in commands from a processing system 4a, 4b . . . 4n sent to the control unit 6 to set a path group or submit I/O requests. For instance, the host adaptor 14 ports may send the processing system ID 128 and host system ID 130 to the control unit 6 ports when a logical connection is established. The control unit 6 may then bind the processing system ID 128 and host system ID 130 with the path group identifier 122 in a path group control block 120. In certain embodiments, only a host 2 with legitimate permission to use a resource, e.g., volume, can establish a path group for the device, so it is the processing system ID 128 and host system ID 130 of a legitimate host that are bound to a path group, identified by a path group ID, for the device, e.g., volume identified by the base address.

In certain embodiments, there may be one base address value present in more than one instance of the path group control block 120. This situation may occur if two processing systems 4a and 4b were each granted permission to access that base address. In such a case, the path group control block 120 containing the processing system ID 128 and the host system ID 130 associated with processing system 4a would contain the base address in its list of base addresses 124, and also the separate path group control block 120 containing the processing system ID 128 and the host system ID 130 associated with processing system 4b would contain the base address in its list of base addresses 124.

In one embodiment where the processing system 4a, 4b . . . 4n comprises a logical partition, the processing system ID 128 comprises an address of the logical partition assigned by the host 2 architecture, such as the host 2 hardware or firmware to uniquely identify the partition. The host system ID 130 may comprise a world wide name (WWN) identifier of the host 2 that is established in the host 2 hardware or firmware at the time of manufacture. In certain embodiments, software executed by the processing system 4a, 4b . . . 4n, such as the operating system 10, may not be able to change the processing system ID 128 and host system ID 130, as this information is configured in host 2 hardware.

Figure 7:
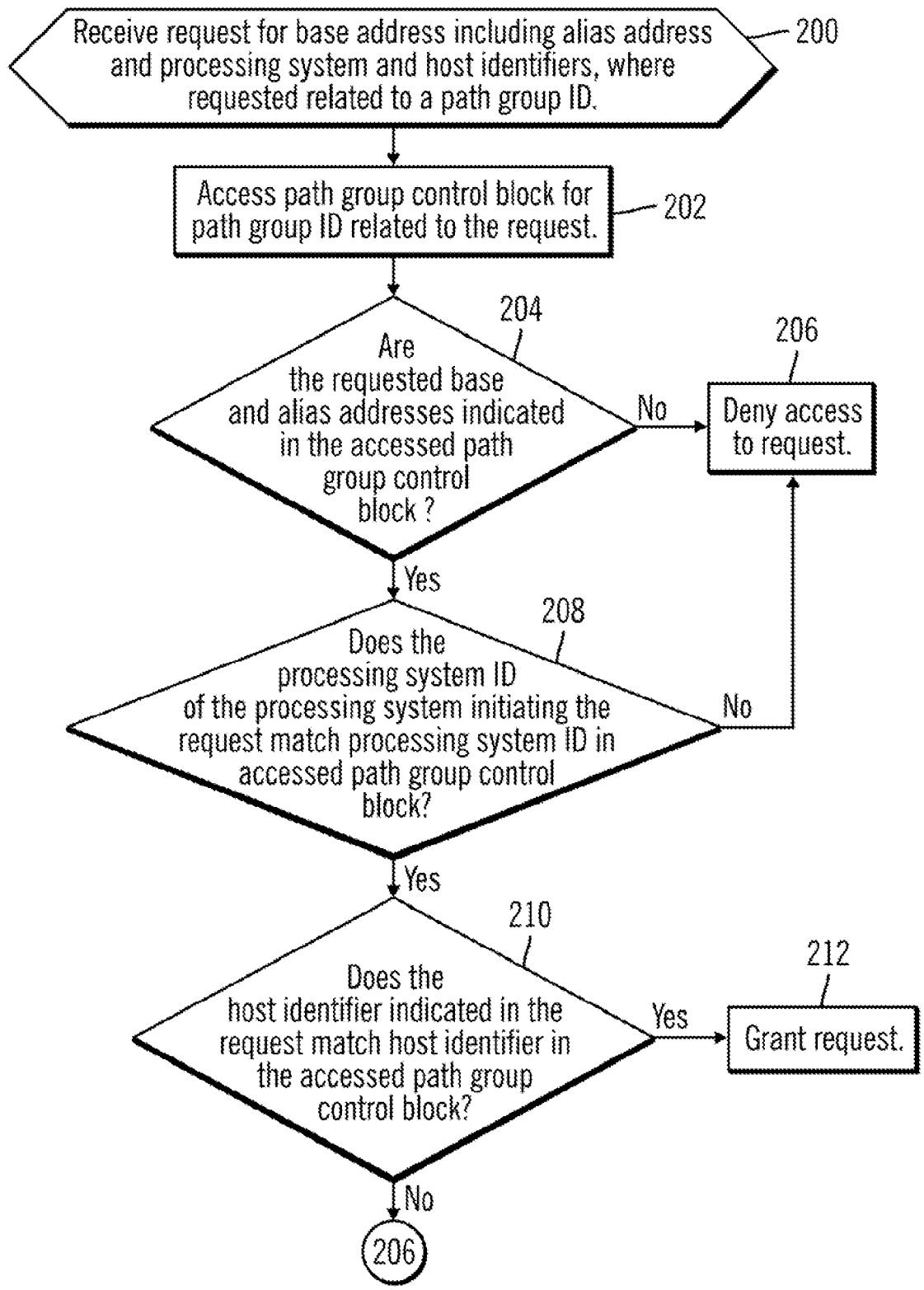
FIG. 7 illustrates an embodiment of operations to process a request to remove an alias address control block from the alias address pool.

FIG. 7 illustrates an embodiment of operations performed by the I/O manager 26 in the control unit 6 to determine whether to execute a processing system 4a, 4b . . . 4n request for a resource, such as a base address, using another resource, such as an alias address. Upon receiving (at block 200) an I/O request for a base address including an alias address and processing system and host identifiers added by the host 2 hardware, the I/O manager 26 accesses (at block 202) the path group control block for the path group associated with the request. The processing system 4a, 4b . . . 4n initiating the request may include the path group ID in a chain of commands or at the start of a chain of commands including the I/O request. The I/O manager 26 determines (at block 204) whether the requested base and alias addresses in the I/O request are indicated in the accessed path group control block 120. This determination is made to verify that the processing system 2 communicating using a path group ID is authorized to access the alias and base addresses indicated in the I/O request by determining whether the alias and base addresses indicated in the I/O request are associated with the path group ID 122 as indicated in fields 124 and 126 of the path group control block 120 for the path group ID 122.

If (at block 204) the requested base and alias addresses are not associated with the path group, e.g., path group ID, on which the request was communicated, then the I/O request is denied (at block 206), meaning the requesting processing system 4a, 4b . . . 4n is denied access to the requested base address using the provided alias address. If (at block 204) the requested base and alias addresses are associated with the path group ID, as indicated in the accessed path group control block 120, then the I/O manager 26 determines (at block 208) whether the processing system ID of the processing system 4a, 4b . . . 4n initiating the request, which is included in the request by the host 2 hardware, matches the processing system ID 128 indicated in the accessed path group control 120. Thus, the I/O manager 26 confirms that the processing system 4a, 4b . . . 4n from which the request was initiated, which may be set by host 2 hardware that cannot be modified by processing system 4a, 4b . . . 4n software, such as the operating system 10, match the processing system ID 28 bound to the path group when the path was established, as indicated in the path group control block 120.

In one embodiment, the request frame can identify the unique processing system 4a, 4b . . . 4n and host IDs. In one embodiment, the host system ID may not be transmitted in the request frame from the host 2 to the control unit 6. Instead, the control unit 6 may maintain an association of source IDs and host IDs, and the request frame may have the source ID. In such case, the control unit 6 can determine the host ID associated with the source ID in the request frame, where the request frame may include the processing system ID and the source ID, but not the host ID.

If (at block 208) the processing system ID provided in the I/O request does not match the processing system ID 128 bound to the path group on which the request is provided, then the I/O manager 26 denies (at block 206) access to the resource identified by the requested base address. If (at block 208) the processing ID included in the I/O request matches the processing system ID 128 bound to the path group, as indicated in the path group control block 120, then the I/O manager 26 determines (at block 210) whether the host identifier indicated in the request, which is included in the request by host 2 hardware, matches the host ID 130 indicated in the accessed path group control block 120. If (at block 210) the host ID in the request matches the host ID 130 bound to the path group, then the request to the resource, e.g., volume, having the base address is granted (at block 212) using the alias address provided in the request. Otherwise, if the host IDs do not match, then control ends with the I/O manager 26 denying access (at block 206) to the requested resource identified by the base address.

In an alternative embodiment, if the processing ID included in the I/O request does match the ID 120 bound to the path group, as indicated by the path group control block 120, then access to the requested base address may be provided through the alias address without performing the additional verifications operations at blocks 210 and 214.

In the described embodiment of FIG. 7, the request included an alias address that may be used to access a resource, such as a volume, identified by a base resource indicated in the request. In alternative embodiments, the request may be directed to a computational resource other than a volume identified by a base and alias addresses, such as another storage device component or other type of device.

In a further alternative embodiment, the I/O request includes a request for a first resource that provides access to a second resource, where the request is generated by processing system 4a, 4b . . . 4n, as the operating system 10, and the request further includes a submitted processing system identifier included in the request by processing system hardware. In such case, the I/O manager 26 determines whether the submitted processing system identifier matches the processing system identifier associated with the first and second resources. In certain embodiments, the first and second resources and processing system identifier may be associated with a path group including a logical path the processing system uses to communicate the I/O request.

The I/O manager 26 may use the path group ID associated with the I/O request to locate the path group control block 120 providing information on associated base and alias addresses, and processing system and host IDs needed to verify the identity of the processing system communicating the I/O request. In one embodiment, to lookup the path group control block 120 for a path group ID associated with the I/O request, the I/O manager 26 may use a hash function of the path group ID to generate an index to an entry in the path group control blocks 34 data structure for the relevant path group ID. In an alternative embodiment, the I/O manager 26 may provide the processing system 4a, 4b . . . 4n a token when the path between the processing system 4a, 4b . . . 4n and path is established, also resulting in the creation of the path group control block 120 for the path. The token may comprise an index to the path group control block 12 for the path in the path group control blocks data structure 34. The processing system 4a, 4b . . . 4n may then present this token with an I/O request that the I/O manager 26 would then use to locate the corresponding path group control block 120 of the path group on which the request is communicated.

Described embodiments provide techniques to verify the identify of a processing system submitting an I/O request for a first resource to access a second resource, or a request for a volume at an alias address to access the volume identified by a base address. Described embodiments utilize identifiers provide by host hardware to verify the identity of the processing system initiating the request, where the identifiers provided in the request cannot be modified by the processing system software. Using hardware supplied identifiers to verify a processing system helps prevent a processing system from spoofing or presenting identification information of an authorized processing system to gain unauthorized access to the resource.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the article of manufacture implementing the code may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made to this configuration without departing from the scope of the present invention, and that the article of manufacture may comprise suitable information bearing medium known in the art. The described embodiments discuss information performed by a host operating system to remove an alias address from a pool. In additional embodiments, the operations may be performed by the control unit to manage an alias address pool for a host or host processing system.

In the described embodiments, the host included a channel subsystem to communicate with a control unit. In alternative embodiments, the host and control unit may utilize any suitable client-server architecture and protocols known in the art to communicate and maintain information on base and alias addresses that may be assigned to a volume.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, 5, and 6 show information maintained in a certain format. In alternative embodiments, the information shown in these figures may be maintained in alternative data structures and formats, and in different combinations.

The illustrated operations of FIG. 7 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining an association of processing system identifiers with resources, including a first and second resources;
    receiving a request from requesting processing system software in a host for use of the first resource that provides access to the second resource, and wherein the request includes a submitted processing system identifier, wherein the received request is associated with a path group identifier provided by the requesting processing system software;
    determining whether the path group identifier associated with the request matches a path group identifier associated with the first and second resources;
        determining whether the submitted processing system identifier is one of the processing system identifiers associated with the first and second resources; and
        providing the requesting processing system software access to the first resource that the processing system uses to access the second resource in response to determining that the submitted processing system identifier is one of the processing system identifiers associated with the first and second resources and determining that the path group identifier associated with the request matches the path group identifier associated with the first and second resources, wherein the first resource provides access to the second resource or an element identified by the second resource.

2. The method of claim 1, wherein the second resource comprises a base address of a volume, wherein the first resource comprises an alias address to use to access the base address.

3. The method of claim 2, wherein base and alias addresses are associated with path group identifiers such that the processing system associated with one path group identifier is provided access to the base volumes associated with that path group identifier, further comprising:
    determining whether the path group identifier associated with the request matches the path group identifier associated with the base and alias address in the request, wherein the determination of whether the submitted processing system identifier matches the processing system identifier associated with the path group identifier is performed in response to determining that the path group identifier associated with the request matches the path group identifier associated with the requested base and alias addresses.

4. The method of claim 2, wherein the request indicates a host identifier, further comprising:
    determining whether the host identifier indicated in the request matches a host identifier associated with the path group identifier associated with the request in response to determining that the submitted processing system identifier matches the processing system identifier associated with the path group identifier, wherein the request to use the alias address to access the base address indicated in the request is granted in response to determining that the host identifier of the host matches the host identifier associated with the path group identifier associated with the request.

5. The method of claim 1, wherein the host identifier is included in the submitted request by the host hardware.

6. A system in communication with processing systems in a host, wherein each processing system includes processing system software, comprising:
    a computer readable storage medium including an association of processing system identifiers with resources, including a first and second resources;
    an Input/Output ("I/O") manager to perform operations, the operations comprising:
        maintaining an association of processing system identifiers with resources, including a first and second resources;
        receiving a request from requesting processing system software in a host for use of the first resource that provides access to the second resource, and wherein the request includes a submitted processing system identifier, wherein the received request is associated with a path group identifier provided by the requesting processing system software;
        determining whether the path group identifier associated with the request matches a path group identifier associated with the first and second resources;
        determining whether the submitted processing system identifier is one of the processing system identifiers associated with the first and second resources; and
        providing the requesting processing system access to the first resource that the processing system uses to access the second resource in response to determining that the submitted processing system identifier is one of the processing system identifiers associated with the first and second resources and determining that the path group identifier associated with the request matches the path group identifier associated with the first and second resources, wherein the first resource provides access to the second resource or an element identified by the second resource.

7. The system of claim 6, wherein the second resource comprises a base address of a volume, wherein the first resource comprises an alias address to use to access the base address.

8. The system of claim 7, wherein base and alias addresses are associated with path group identifiers such that the processing system associated with one path group identifier is provided access to the base volumes associated with that path group identifier, wherein the operations further comprise:

determining whether the path group identifier associated with the request matches the path group identifier associated with the base and alias address in the request, wherein the determination of whether the submitted processing system identifier matches the processing system identifier associated with the path group identifier is performed in response to determining that the path group identifier associated with the request matches the path group identifier associated with the requested base and alias addresses.

9. The system of claim 7, wherein the request indicates a host identifier, wherein the operations further comprise:

determining whether the host identifier indicated in the request matches a host identifier associated with the path group identifier associated with the request in response to determining that the submitted processing system identifier matches the processing system identifier associated with the path group identifier, wherein the request to use the alias address to access the base address indicated in the request is granted in response to determining that the host identifier of the host matches the host identifier associated with the path group identifier associated with the request.

10. The system of claim 6, wherein the host identifier is included in the submitted request by the host hardware.

11. An article of manufacture comprising a computer readable storage medium implementing an Input/Output (I/O) manager in communication with processing systems in a host, wherein each processing system includes processing system software, wherein the I/O manager is executed to cause operations, the operations comprising:

maintaining an association of processing system identifiers with resources, including a first and second resources;

receiving a request from requesting processing system software in a host for use of the first resource that provides access to the second resource, and wherein the request includes a submitted processing system identifier, wherein the received request is associated with a path group identifier provided by the requesting processing system software;

determining whether the path group identifier associated with the request matches a path group identifier associated with the first and second resources;

determining whether the submitted processing system identifier is one of the processing system identifiers associated with the first and second resources; and providing the requesting processing system software access to the first resource that the processing system uses to access the second resource in response to determining that the submitted processing system identifier is one of the processing system identifiers associated with the first and second resources and determining that the path group identifier associated with the request matches the path group identifier associated with the first and second resources, wherein the first resource provides access to the second resource or an element identified by the second resource.

12. The article of manufacture of claim 11, wherein the second resource comprises a base address of a volume, wherein the first resource comprises an alias address to use to access the base address.

13. The article of manufacture of claim 12, wherein base and alias addresses are associated with path group identifiers such that the processing system associated with one path group identifier is provided access to the base volumes associated with that path group identifier, wherein the operations further comprise:

determining whether the path group identifier associated with the request matches the path group identifier associated with the base and alias address in the request, wherein the determination of whether the submitted processing system identifier matches the processing system identifier associated with the path group identifier is performed in response to determining that the path group identifier associated with the request matches the path group identifier associated with the requested base and alias addresses.

14. The article of manufacture of claim 12, wherein the request indicates a host identifier, wherein the operations further comprise:

determining whether the host identifier indicated in the request matches a host identifier associated with the path group identifier associated with the request in response to determining that the submitted processing system identifier matches the processing system identifier associated with the path group identifier, wherein the request to use the alias address to access the base address indicated in the request is granted in response to determining that the host identifier of the host matches the host identifier associated with the path group identifier associated with the request.

15. The article of manufacture of claim 11, wherein the host identifier is included in the submitted request by the host hardware.

* * * * *